(12) United States Patent
Brantner et al.

(10) Patent No.: US 7,183,693 B2
(45) Date of Patent: Feb. 27, 2007

(54) METHOD AND APPARATUS FOR AN AMBIENT ENERGY BATTERY RECHARGE SYSTEM

(75) Inventors: Paul Brantner, Conifer, CO (US); Michael Baker Pearce, Loveland, CO (US); Adolph Trujillo, Arvada, CO (US)

(73) Assignee: Infinite Power Solutions, Inc., Golden, CO (US)

( * ) Notice: Subject to any disclaimer, the term of this patent is extended or adjusted under 35 U.S.C. 154(b) by 0 days.

(21) Appl. No.: 11/393,326

(22) Filed: Mar. 30, 2006

(65) Prior Publication Data

US 2006/0181176 A1    Aug. 17, 2006

Related U.S. Application Data

(60) Provisional application No. 10/611,431, filed on Jul. 2, 2003, now Pat. No. 7,088,031, provisional application No. 60/464,357, filed on Apr. 22, 2003.

(51) Int. Cl.
*H01L 41/08* (2006.01)

(52) U.S. Cl. .................. 310/319; 310/328; 310/339

(58) Field of Classification Search ................ 310/321, 310/319, 328, 338, 339
See application file for complete search history.

(56) References Cited

U.S. PATENT DOCUMENTS

| | | | |
|---|---|---|---|
| 3,463,942 A | 8/1969 | Mellon | |
| 3,559,027 A | 1/1971 | Arsem | |
| 3,701,903 A | 10/1972 | Merhar | |
| 3,940,637 A | 2/1976 | Ohigashi et al. | |
| 3,976,899 A | 8/1976 | Fanshawe | |
| 4,185,621 A | 1/1980 | Morrow | |
| 4,226,924 A | 10/1980 | Kimura et al. | |
| 4,239,974 A | 12/1980 | Swander et al. | |
| 4,320,477 A | 3/1982 | Baumgartner | |
| 4,360,860 A | 11/1982 | Johnson et al. | |
| 4,402,524 A | 9/1983 | D'Antonio et al. | |
| 4,409,548 A | 10/1983 | Focht | |
| 4,467,236 A | 8/1984 | Kolm et al. | |

(Continued)

FOREIGN PATENT DOCUMENTS

EP        0 673 102 A        9/1995

(Continued)

OTHER PUBLICATIONS

MIT Media Lab, "Human-powered wearable computing," 35 (3&4) IBM Sys. J. (1996).

*Primary Examiner*—Mark Budd
(74) *Attorney, Agent, or Firm*—Jeff E. Schwartz; Nixon Peabody, LLP

(57) ABSTRACT

The present invention relates to the field of battery and capacitor charging. In particular, the present invention provides pulsed current charging using changes, regardless of polarity, in the local energy environment to obtain power. The present invention relates, for example, to ambient energy charging thin film batteries, other batteries, or capacitors, via, for example, polyvinyladine fluoride homopolymer (PVDF), PVDF bi-axially poled, or other piezoelectric materials. Ambient energy may be defined as any change in energy within the local environment. Charging can be accomplished with, and is not limited to, positive or negative changes of the following energy types: thermal; visible light, including infrared and ultraviolet; mechanical motion or impact; triboelectric, including airflow or physical contact; movement in relation to a gravitational plane (increase or decrease in gravitational potential energy); and radio frequency (RF) electromagnetic energy, regardless of specific frequency.

44 Claims, 7 Drawing Sheets

U.S. PATENT DOCUMENTS

| | | | |
|---|---|---|---|
| 4,500,838 A | 2/1985 | Bloomer et al. | |
| 4,504,761 A | 3/1985 | Triplett | |
| 4,523,261 A | 6/1985 | West | |
| 4,612,472 A | 9/1986 | Kakizaki et al. | |
| 4,701,835 A | 10/1987 | Campagnuolo et al. | |
| 4,893,049 A | 1/1990 | Bundy et al. | |
| 4,943,752 A | 7/1990 | Todd et al. | |
| 5,039,928 A | 8/1991 | Nishi et al. | |
| 5,053,693 A | 10/1991 | Bohnert et al. | |
| 5,065,067 A | 11/1991 | Todd et al. | |
| 5,092,243 A | 3/1992 | Hawkins et al. | |
| 5,389,850 A | 2/1995 | Wilmer | |
| 5,512,795 A | 4/1996 | Epstein | |
| 5,552,656 A | 9/1996 | Taylor | |
| 5,751,091 A | 5/1998 | Takahashi et al. | |
| 5,801,475 A | 9/1998 | Kimura | |
| 5,814,921 A | 9/1998 | Carroll | |
| 5,838,138 A | 11/1998 | Henty | |
| 5,856,722 A * | 1/1999 | Haronian et al. | 310/321 |
| 6,079,274 A * | 6/2000 | Ando et al. | 73/649 |
| 6,198,205 B1 | 3/2001 | Oberlin et al. | |
| 6,223,601 B1 * | 5/2001 | Harada et al. | 73/649 |
| 6,307,142 B1 | 10/2001 | Allen et al. | |
| 6,342,776 B1 | 1/2002 | Taylor et al. | |
| 6,411,016 B1 | 6/2002 | Umeda et al. | |
| 6,433,465 B1 | 8/2002 | McKnight et al. | |
| 6,737,789 B2 | 5/2004 | Radziemski et al. | |
| 7,088,031 B2 * | 8/2006 | Brantner et al. | 310/319 |
| 7,116,035 B2 * | 10/2006 | Sugawara | 310/322 |
| 2002/0009320 A1 | 1/2002 | Ahmed | |

FOREIGN PATENT DOCUMENTS

| | | |
|---|---|---|
| GB | 2 095 053 A | 9/1982 |
| JP | 63-310336 A | 12/1988 |
| JP | 07-114437 A | 5/1995 |
| JP | 10-283870 A | 5/1997 |
| JP | 09-139139 A | 9/1997 |
| JP | 2001-154783 A | 6/2001 |
| JP | 2001-327197 A | 11/2001 |
| JP | 2002-218769 A | 8/2002 |

* cited by examiner

METHOD AND APPARATUS FOR AN AMBIENT ENERGY BATTERY RECHARGE SYSTEM

CROSS REFERENCE TO RELATED APPLICATIONS

The present application is a continuation and claims the benefit under 35 U.S.C. § 120 of U.S. patent application Ser. No. 10/611,431, filed 2 Jul. 2003, now U.S. Pat. No. 7,088,031 related to and claims the benefit under 35 U.S.C. § 119(e) of U.S. provisional patent application Ser. No. 60/464,357, filed 22 Apr. 2003, which are expressly incorporated fully herein by reference.

FIELD OF THE INVENTION

The present invention relates to the field of battery and capacitor charging. In particular, the present invention provides pulsed current charging using changes, regardless of polarity, in the local energy environment to obtain power. The present invention relates, for example, to ambient energy charging thin film batteries, other batteries, or capacitors, via, for example, polyvinyladine fluoride homopolymer (PVDF), PVDF bi-axially poled, or other piezoelectric materials. Ambient energy may be defined as any change in energy within the local environment. Charging can be accomplished with, and is not limited to, positive or negative changes of the following energy types: thermal; visible light, including infrared and ultraviolet; mechanical motion or impact; triboelectric, including airflow or physical contact; movement in relation to a gravitational plane (increase or decrease in gravitational potential energy); and radio frequency (RF) electromagnetic energy, regardless of specific frequency. Defined elements of this invention, potentially including, for example, size of piezoelectric material, mechanical mounting and coupling of piezoelectric material, energy translation into useful current at required voltage levels, regulation (voltage or current), and filtering (if necessary), may all be tuned to fit or combine with required outputs in any specific environment based on the relative abundance of one type of energy over others in a particular environment.

DESCRIPTION OF THE ART

Presently, there are certain devices available that use relatively high frequency and/or impact energy to charge batteries or capacitors. Energy pulses from these devices may be at significant voltage levels and may be converted into useable charge energy with simple rectification. Previous devices for the collection of mechanical energy other than impact energy generally require a significant amount of motion within the device to generate useable charge pulses. Relatively large voltage pulses from changes in temperature, 8 volts per 1° C. (open circuit) for bi-axially poled PVDF film are also available for charging a battery or capacitor.

Battery charging techniques for portable devices have been discussed in a number of patents such as U.S. Pat. Nos. 3,559,027; 4,320,477; 4,360,860; 4,701,835; 5,039,928; and 6,307,142. Additionally, certain patents such as U.S. Pat. Nos. 4,523,261; 4,943,752; and 5,065,067 have discussed the use of piezoelectric elements to provide energy to an electrical circuit. Moreover, some patents such as U.S. Pat. Nos. 4,185,621; 4,239,974; 4,504,761; 5,838,138; and 6,342,776 discuss the use of piezoelectric elements in combination with an electric circuit that includes a rechargeable battery. Additionally, IBM Systems Journal Vol. 35, No. 3& 4, 1996—MIT Media Lab "Human-powered wearable computing" discusses the various energy expenditures of everyday human activity and discusses techniques and devices for harnessing human energy.

Certain charging systems for conventional batteries also require access to system power because of the high power requirements of the charging system and the rechargeable device. Additionally, charging systems typically require an external electrical (contact-type) connection between an external power source and the charger or charger/battery combination.

Because a piezoelectric event generally produces only small amounts of energy, attempts at producing and storing usable energy from piezoelectric materials have generally been limited to consuming the energy as soon as it is produced. Although applications such as switches and transducers made from piezoelectric material produce an output, this output has been largely classified as sensor-level, energy-only signals which may be recognized and processed by additional circuitry. Storing the energy from these events is considered expensive and therefore generally undesirable, in part because battery technologies exhibit leakage currents that consume energy at a level similar to that produced by piezoelectric material. Thus, conventional energy collection and storage systems are considered to be too expensive and/or inefficient to supply energy in usable quantities for present or future use.

SUMMARY OF THE INVENTION

The present invention relates, for example, to charging batteries or other storage elements using a piezoelectric element to supply energy. The present invention relates to a battery or capacitor charge device that allows the use of previously unusable changes in local energy, regardless of polarity, by the beneficial effect of stacking available charge energy.

There may be significant advantages of stacking low frequency energy. For example, stacking low frequency energy allows the use of local energy change events (positive or negative) that were previously not of sufficient charge value or voltage levels to be useable in even the lowest voltage circuitry.

Another advantage of the present invention is that, in contrast to previous devices, the present invention preferably operates when supplied with even small amounts of energy such as longitudinal stretch motion relative to the object on which it is mounted. Furthermore, this stretch may supply energy even if it is limited to approximately 1.5 µm. Moreover, in temperature-based charging applications, the present invention may output pulses based on a significantly smaller temperature change due to the beneficial effect of charge stacking. In a stacked element array, the temperature change may be the same for all elements. Thus, to obtain the same voltage as with a prior charger that does not employ stacking, a change of 1° C./the number of elements=the change in degrees Centigrade required to obtain an 8 volt output pulse. For example, in a five element stack, a 0.2° C. (one fifth degree Celsius) change may produce an approximate 8 volt open circuit output pulse.

An object of the present invention is to provide an ambient energy battery charging device that may be optimized for almost any environment. Another object of the present invention is to provide an ambient energy capacitor charging device that may be optimized for almost any environment.

One embodiment of the present invention may be an apparatus for use as a charger utilizing ambient energy including a plurality of stacked piezoelectric elements, a rectification block on an output of each of the elements, a plurality of capacitors arranged to accumulate charge from the rectification blocks, and a blocking diode provided at an output of the plurality of capacitors. Moreover, in certain embodiments, a charge storage device may be connected to an output of the blocking diode.

In a particular embodiment of the present invention, the rectification block may be a full-wave rectification block or a half-wave rectification block. The apparatus may include five or more stacked piezoelectric elements. Moreover, in a further embodiment of the present invention, the apparatus may further include a signal phase delay element (such as, for example, an inductor) provided between the rectification blocks and the capacitors. In another particular embodiment of the present invention, the charge storage device may comprise a battery or capacitor.

The apparatus may be optimized for changes in ambient power from gravitational effects on a structure rotating at an angle to the surface of a significant gravity source. A wheel may be an example of such a structure. An appropriate angle to the surface may be approximately perpendicular, or approximately 90 degrees. Such an angle may provide the maximum amount of useful energy. In general, if other angles are used, the useful component will be the component perpendicular to the surface. Significant gravity sources may include the earth, the moon, or an asteroid.

The apparatus may be optimized for changes in ambient power from a human or other heartbeat. The apparatus may alternatively be optimized for changes in ambient power available from local electrical fields, particularly those on the approximate range of 50 to 60 Hz. In another embodiment, the apparatus may be optimized for changes in ambient power available from low power sound or ultrasound energy. In yet another embodiment, the apparatus may be optimized for changes in ambient power available from RF spectrum energy fields. In another embodiment, the apparatus may be optimized for changes in magnetic fields. Additionally, the apparatus may be optimized to capture very low frequency energy of any frequency down to the limit of the piezoelectric material. This limit is believed to be about 0.001 Hz for DT-1 material from Measurement Specialties Incorporated (Fairfield, N.J.).

In certain embodiments of the present invention, the apparatus may incorporate circuit board technology. In such an embodiment, the device's capacitive, resistive (if any), or inductive elements may be part of the circuit board or traces upon the circuit board, rather than discrete components. Additionally, inductors may be incorporated in certain embodiments. These may be particularly useful in adjusting the phase of the energy from each element in the stack and may aid in preventing the output of one element from canceling a portion of the output from another element.

Another embodiment of the present invention may be a method of manufacturing a charger utilizing ambient energy including the steps of arranging a plurality of piezoelectric elements into a stack, connecting a rectification block on an output of each of the elements, arranging a plurality of capacitors to accumulate charge from said rectification blocks, and providing a blocking diode at an output of said plurality of capacitors. A further embodiment of the present invention may include the step of connecting a charge storage device to an output of said blocking diode. In a particular embodiment of the present invention, the step of arranging may include providing said plurality of piezoelectric elements arranged in a stack according to size.

It is understood that both the foregoing general description and the following detailed description are exemplary and explanatory only and are not restrictive of the invention as claimed. The invention is described in terms of solid-state thin-film batteries; however, one skilled in the art will recognize other uses for the invention. The accompanying drawings illustrating an embodiment of the invention together with the description serve to explain the principles of the invention.

DETAILED DESCRIPTION OF THE INVENTION

Figure 1:
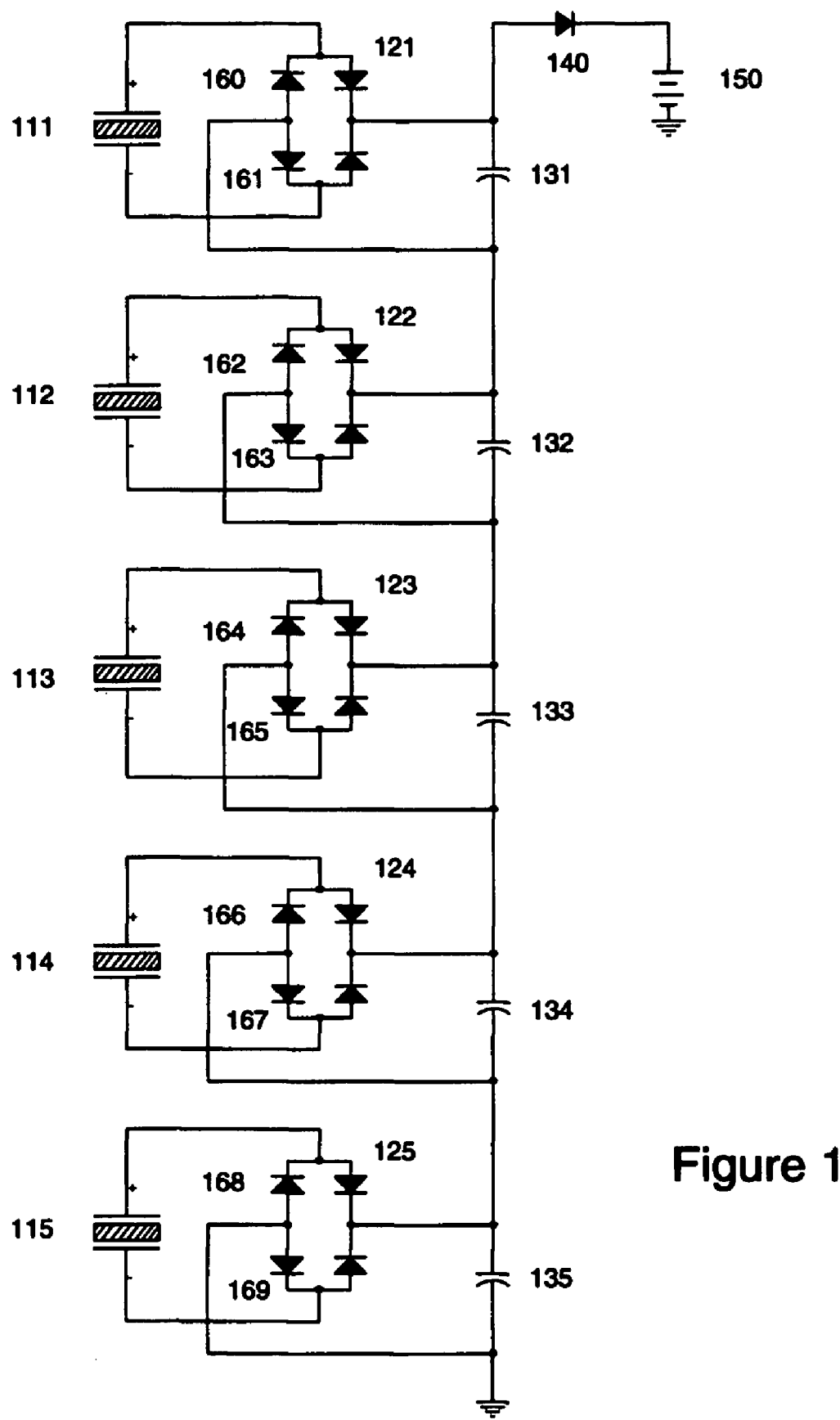
FIG. 1 is a schematic diagram of a five-element stack within an embodiment of the present invention.

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. All references cited herein are incorporated by reference herein in their entirety.

As described in this specification, applied force is shown as being in the same general direction and magnitude to each element. The type of force does not particularly matter and a generic force vector will be used. Cases involving a different force applied versus film area or changes in force direction may readily be inferred from the described case, by an ordinarily skilled artisan. Small variables due to discrete component characteristics are not shown as specific component values can vary; and further because, although this may optimize performance, it does not affect primary performance.

In general, force applied to a PVDF film may cause longitudinal motion of at least a portion of the film. This longitudinal displacement of a portion of the film can generate a voltage output. The magnitude of the voltage output depends, for example, on the force applied, the physical dimension of the PVDF film, and the capacitance of the film. The PVDF film may be coated with a conductive surface to remove Coulombs of charge. In another embodiment, the PVDF film may be in contact with a conductor to remove charge. This process may be reversible, thus, for example, voltage applied to a conductively coated PVDF film surface may cause physical motion in the film. In bi-axially poled PVDF, most of such voltage induced movement may be in the longitudinal direction. Typically only about 1/1000 of the movement will be in any other direction. PVDF film that may be used in accordance with the present invention may be such film as DT1 film from Measurement Specialties Incorporated (Fairfield, N.J.).

FIG. 1 is a circuit diagram of an embodiment of the present invention. The diagram illustrates one way in which five piezoelectric elements (111, 112, 113, 114, and 115) may be electrically connected in combination with five bridge networks (121, 122, 123, 124, and 125), five capacitors (131, 132, 133, 134, and 135), a blocking diode (140), and a battery (150). It may readily be seen that a diagram for a four element stack may be the same as for the five element stack except that capacitor 134 would be connected to ground and piezoelectric element 115, bridge network 125, and capacitor 135 would be omitted.

Figure 2A:
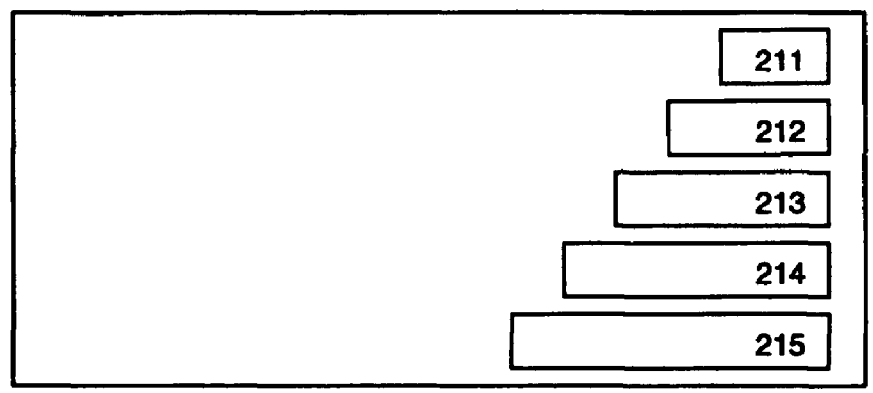
FIGS. 2A–2C are mechanical drawings of a five-element stack, one type of physical PVDF layout.
Figure 2B:
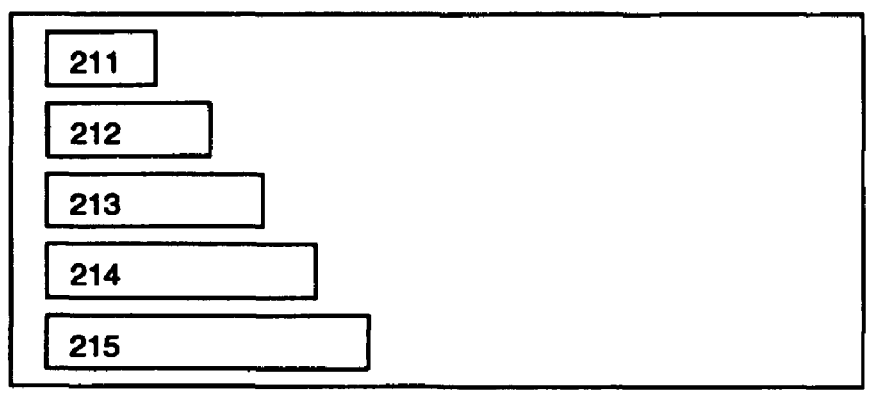
Figure 2C:
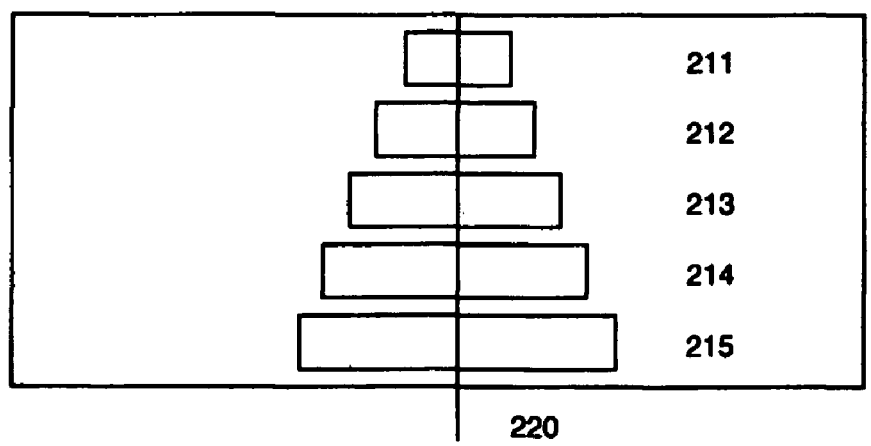

FIGS. 2A, 2B, and 2C are drawings of a five element stack. FIG. 2A corresponds to a top view of a five element stack. FIG. 2B corresponds to a bottom view of a five element stack. Finally, FIG. 2C shows the application of force though a force application center 220 in view that superimposes top and bottom views. This embodiment is adapted, for example, to convert ambient mechanical energy. A single PVDF film may be sectioned into five segments of increasing lengths as shown. These segments (or elements) 211, 212, 213, 214, and 215 (which may correspond to piezoelectric elements 111, 112, 113, 114, and 115 in FIG. 1) may be ordered from smallest to largest as depicted. Elements may be created in different sizes to provide specifically higher voltages as the film size increases for an evenly applied force across the PVDF film. This permits the stack to obtain a positive charge from top to bottom (for example, from the positive (+) terminal of capacitor 131 to the negative (−) terminal of capacitor 135 in circuit diagram, FIG. 1). Capacitors 131 through 135 may preferably be matched in size to the specific capacitance value of the PVDF element with which they are paired. They may be paired via rectification bridges—shown as 160 through 169 in the circuit diagram. These rectification bridges may preferably be full-wave rectification bridges, but may alternatively be half-wave bridges. One advantage of full-wave bridges may be the ability to capture energy of both polarities. Such a matched pairing may permit maximum charge transfer from the film. Essentially, the charge transfer may preferably allow the maximum voltage generated on the PVDF film, minus two diode forward voltage drops, to be collected on the associated capacitor.

A preferred rectification block, for use with the present invention, is a full wave rectifier as this allows voltages lower in the stack to appear on both surfaces of elements higher in the stack. This configuration may also help, for example, in preventing or diminishing the effect of individual elements that may convert applied voltage on one side to mechanical motion within the film in a direction contrary to applied force.

Force may be applied to the film roughly perpendicular to the top surface at the center of the film, along the force line in the drawing, via an attached mass. For any applied force, a voltage may be generated across each piezoelectric element inversely proportional to the size of the element.

Figure 3:
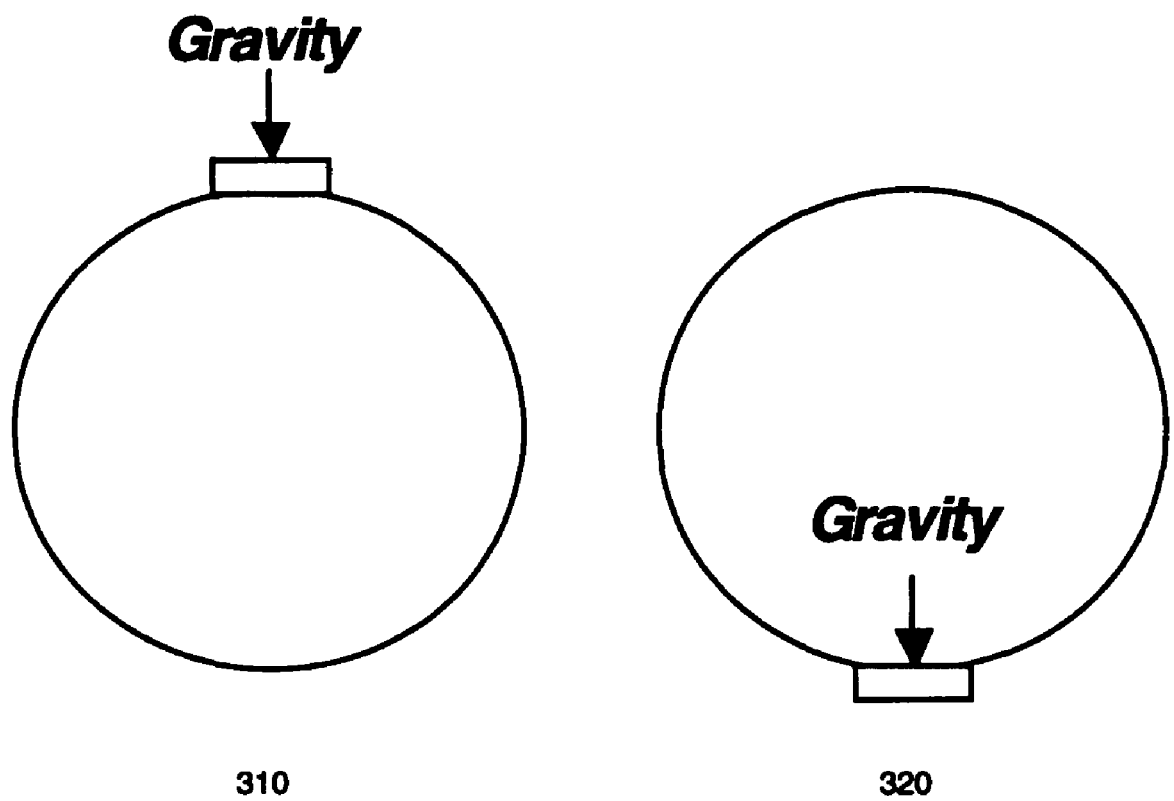
FIG. 3 is a general layout depicting a charge device optimized for gravitational energy capture mounted on a wheel at 90° to the surface of the earth or other significant mass (planets, moons, asteroids, etc.).

FIG. 3 is a depiction of an embodiment of the present invention that employs a piezoelectric element in a rotational setting. As such an embodiment rotates, the gravitational force on the piezoelectric element changes through 360 degrees of rotation. In a situation in which gravitational attraction is 1 G, the force (in the longitudinal direction) on the element (due to gravity) will vary between 1 G (as seen in position 320) and −1 G (as seen in position 310) over the course of the rotation.

Figure 4:
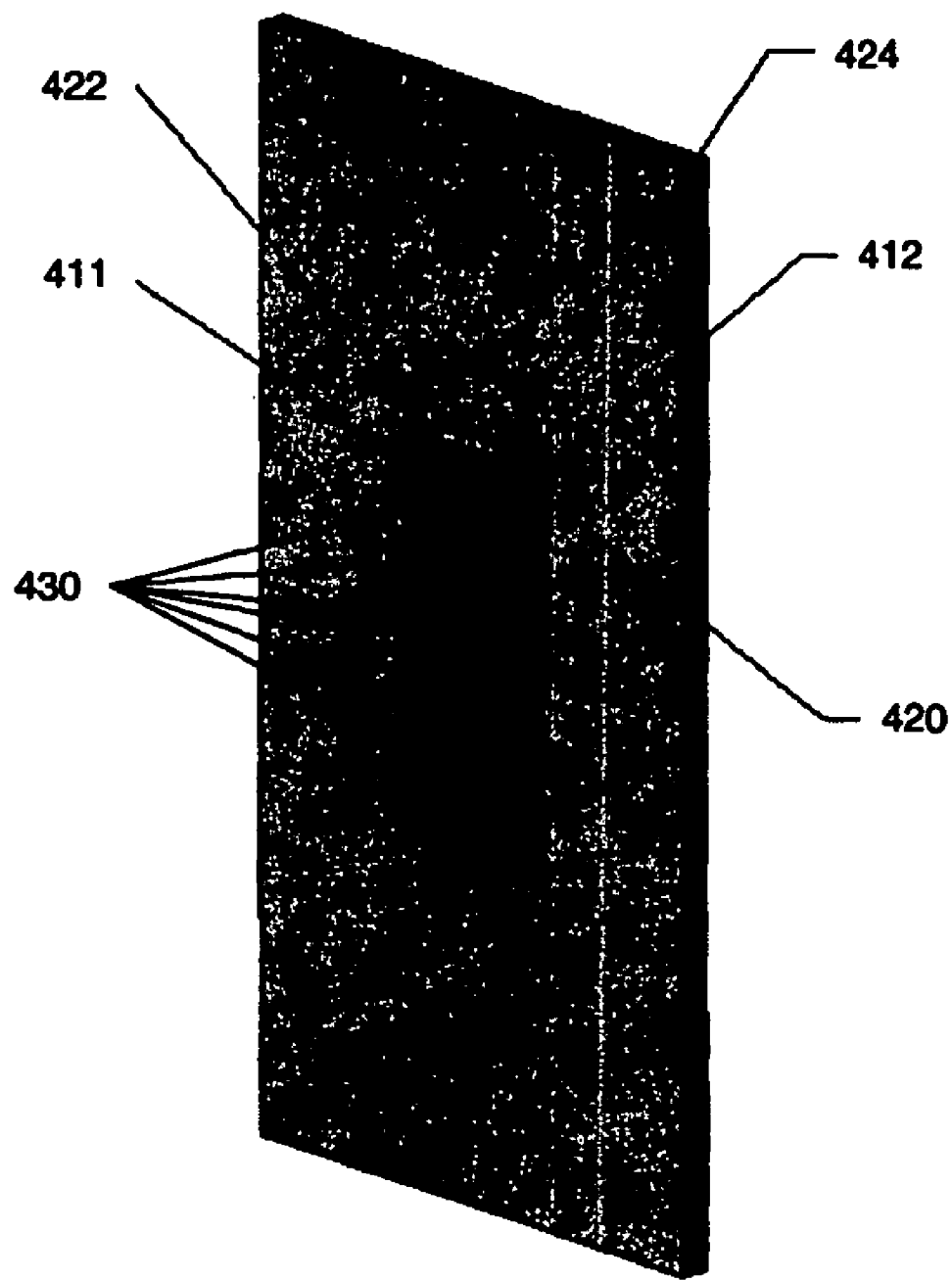
FIG. 4 is a general layout depicting a charge device optimized for electromagnetic energy capture.
Figure 6:
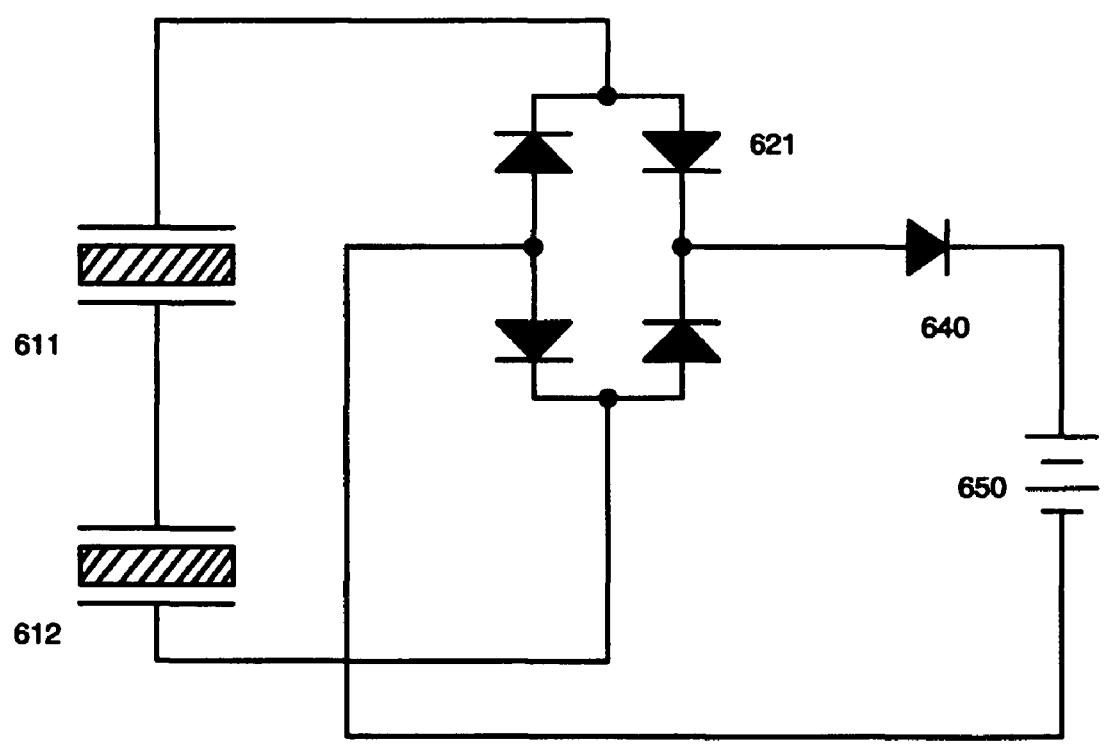
FIG. 6 is a schematic diagram of a two film, single element, charge device for capture of 50 to 60 HZ RF energy.

FIG. 4 is a depiction of two PVDF films (411 and 412) coupled mechanically together with, for example, a slight amount of stretch applied in the longitudinal axis. This embodiment of the present invention may be particularly useful in environments that include ambient RF energy. The mechanical interface between the films (411 and 412) may be enhanced by small rods (430) attached to the substrate as shown in FIG. 4. Both films (411 and 412) may be attached firmly to the substrate at the substrate's ends. Both films (411 and 412) also may be coated with a conductive layer on, for example, both their top and bottom surfaces. In an embodiment that is not shown here, the film may be in contact with a conductor that may collect the charge from the surfaces of the film. A circuit diagram for this device is shown in FIG. 6. The film conductive surfaces at the center of the device 420 may preferably be the same dimension or slightly smaller than the outer surfaces 422 and 424 (which may be the positive and negative terminals respectively) to aid in preventing RF energy from striking the center of the device.

RF energy, particularly low frequency RF, may tend to strike the outer layers of one or the other film (411 or 412) from a given direction. Energy that strikes both films (411 and 412) at the same magnitude, frequency, and phase angle may essentially cancel itself out. However, when RF energy asymmetrically strikes an outer film 411 surface, that film surface may gather charge, acting essentially as a capacitive antenna. As charge builds on the outer surface, the film 411 may change length. When the first film 411 changes length, the second film 412 may also change length, in the same direction, because it is mechanically coupled to the first film 411. This paired expansion may then allow the second film 412 to output a proportional voltage. Thus, an applied voltage may exist on the first film 411 (due to the direct application of RF energy) and the added voltage produced by the piezoelectric effect in the second film 412. Such a configuration may build voltage higher than what would be expected from simple Coulomb charge on the first film 411 due to incident RF. Experimentally, in a near field test using 110 Vrms, 170 Vrms values have been demonstrated into a 10 Mohm load.

Figure 5:
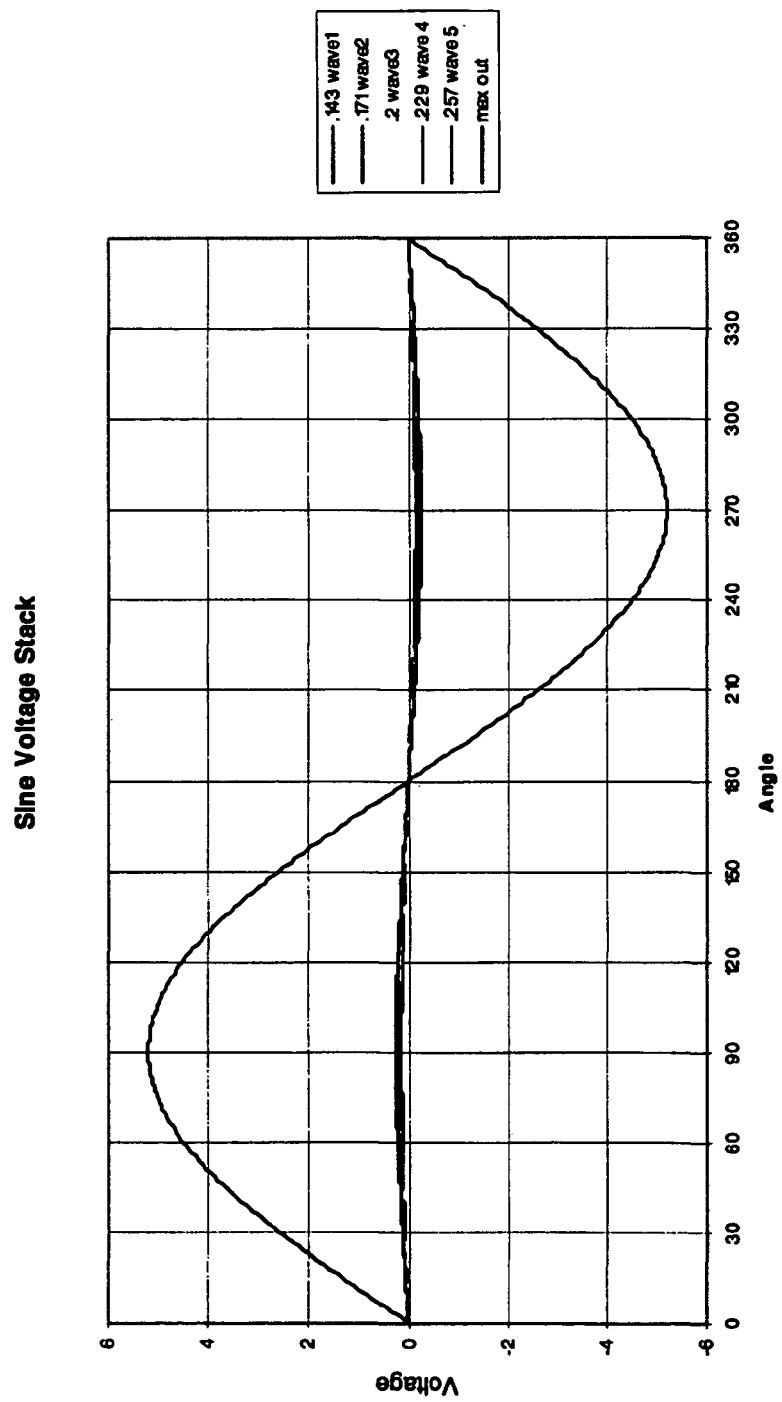
FIG. 5 is a diagram of sine wave type energy stacking.

FIG. 5 is a graph of voltages output from an embodiment of the present invention including a PVDF film and stack capacitors. The voltages, in this example, are generated by a PVDF film and stored in five stack capacitors by percentage of total output. This percentage may be based on the ratio of film element capacitance to total element capacitance using the element sizing depicted in, for example, FIGS. 2A–2C. If a circuit such as the one shown in FIG. 1 is employed, the voltages across the individual capacitors (131, 132, 133, 134, and 135) may vary as shown in corresponding proportional voltages (531, 532, 533, 534, and 535) depicted as waveforms. In this example, capacitor 131's proportional voltage 531 is 25.7% of the total output voltage 536 (also depicted as a waveform). Capacitor 132's proportional voltage 532 is 22.9% of total voltage 536. Capacitor 133's proportional voltage 533 is 20.0% of total voltage 536. Capacitor 134's proportional voltage 534 is 17.1% of total voltage 536. Capacitor 135's proportional voltage 535 is 14.3% of total voltage 536.

FIG. 6 is a schematic diagram of a two film, single element, charge device for capture of 50 to 60 HZ RF energy, such as the one depicted in FIG. 4. This embodiment includes two piezoelectric elements (611 and 612) connected to one bridge network (621). The bridge network (621) may be connected to a diode (640) and a battery (650).

Figure 7:
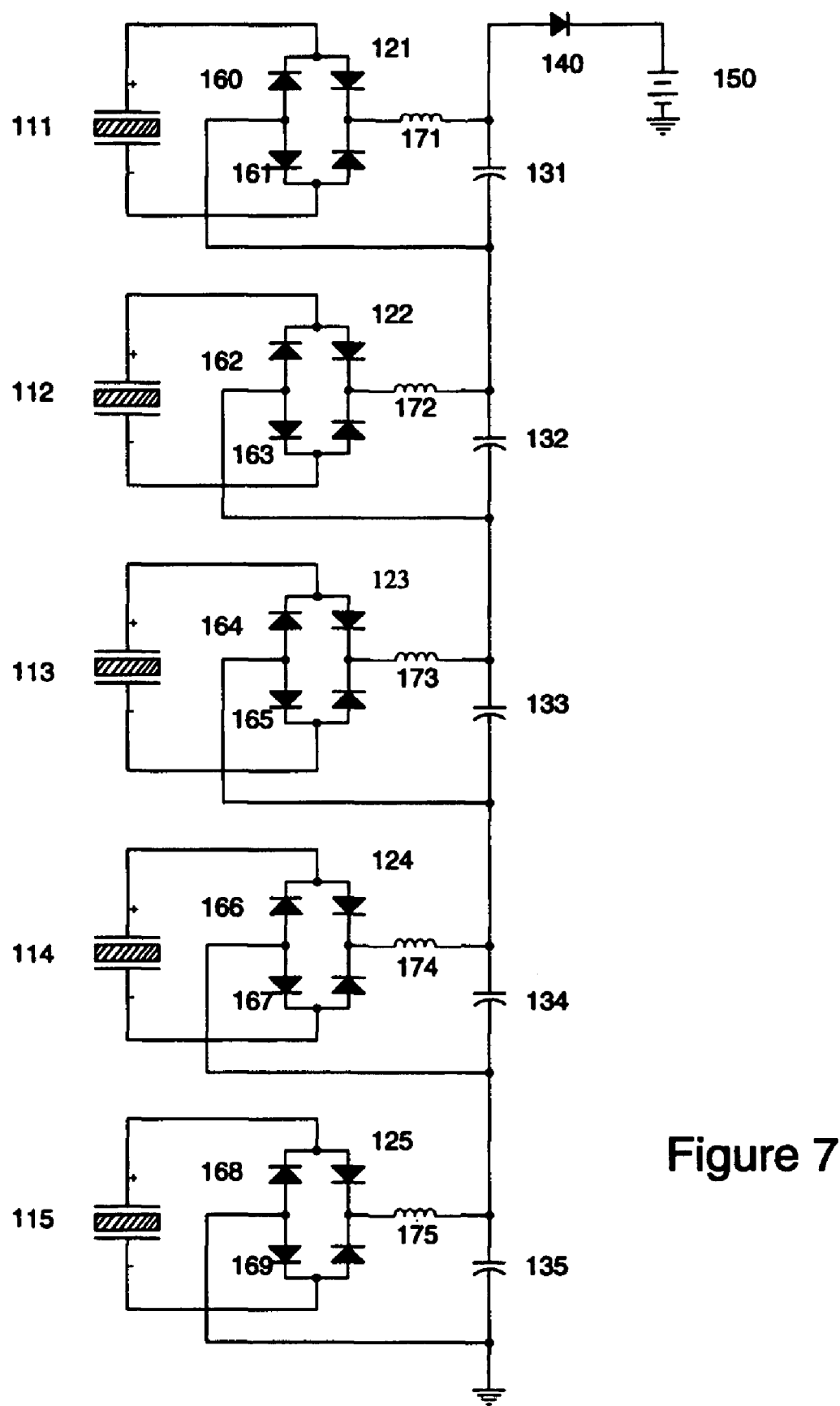
FIG. 7 is a schematic diagram of a five-element stack, with an optional signal phase delay element, such as an inductor, for example, in a further embodiment of the invention.

FIG. 7 is a circuit diagram of an alternative embodiment of the present invention, in which the apparatus may include signal phase delay elements, such as inductors (171, 172, 173, 174, and 175), for example, provided between the rectification bridges (160, 161, 162, 163, 164, 165, 166, 167, 168, and 169) and the capacitors (131, 132, 133, 134, and 135). This alternative embodiment may be useful in adjusting the phase of the energy from each element in the stack and may aid in preventing the output of one element from canceling a portion of the output from another element.

Other embodiments of the invention will be apparent to those skilled in the art from consideration of the specification and the practice of the invention disclosed herein. It is intended that the specification and examples be considered as exemplary only, with a true scope and spirit of the invention being indicated by the following claims.

What is claimed is:

1. An apparatus for use as a charger utilizing ambient energy comprising
    a plurality of stacked piezoelectric elements of different geometrical sizes stacked from smallest to largest,
    a rectification block on an output of each of said elements,
    a plurality of capacitors arranged to accumulate charge from said rectification blocks, and
    a blocking diode provided at an output of said plurality of capacitors.
2. The apparatus of claim 1, further comprising a charge storage device connected to an output of said blocking diode.
3. The apparatus of claim 1, wherein said rectification block is selected from the group consisting of a full-wave rectification block and a half-wave rectification block.
4. The apparatus of claim 1, comprising five or more stacked piezoelectric elements.
5. The apparatus of claim 1, further comprising a signal phase delay element provided between said one or more of said rectification blocks and said plurality of capacitors.
6. The apparatus of claim 1, wherein said signal phase delay element comprises an inductor.
7. The apparatus of claim 2, wherein said charge storage device comprises a battery.
8. The apparatus of claim 2, wherein said charge storage device comprises a capacitor.
9. The apparatus of claim 1, wherein said apparatus is optimized for changes in ambient power from gravitational effects on a structure rotating at an angle to the surface of a significant gravity source.
10. The apparatus of claim 9, wherein said structure is a wheel.
11. The apparatus of claim 9, wherein said angle is approximately 90 degrees.
12. The apparatus of claim 9, wherein said gravity source is the earth.
13. The apparatus of claim 1, wherein said apparatus is optimized for changes in ambient power from a heartbeat.
14. The apparatus of claim 13, wherein said heartbeat is a human heartbeat.
15. The apparatus of claim 1, wherein said apparatus is optimized for changes in ambient power available from local electrical fields.
16. The apparatus of claim 15, wherein said electric field comprise a field in the approximate range of 50 to 60 Hz.
17. The apparatus of claim 1, wherein said apparatus is optimized for changes in ambient power available from low power sound energy.
18. The apparatus of claim 1, wherein said apparatus is optimized for changes in ambient power available from ultrasound energy.
19. The apparatus of claim 1, wherein said apparatus incorporates circuit board technology.
20. The apparatus of claim 19, wherein said capacitors are not discrete elements.
21. The apparatus of claim 1, wherein said apparatus is optimized for changes in ambient power available from RF spectrum energy fields.
22. The apparatus of claim 1, wherein said apparatus is optimized for changes in magnetic fields.
23. A method of manufacturing a charger utilizing ambient energy comprising
    arranging a plurality of piezoelectric elements of different geometrical sizes into a stack from largest to smallest,
    connecting a rectification block on an output of each of said elements,
    arranging a plurality of capacitors to accumulate charge from said rectification blocks, and
    providing a blocking diode at an output of said plurality of capacitors.
24. The method of claim 23, further comprising connecting a charge storage device to an output of said blocking diode.
25. The method of claim 23, wherein said rectification block is selected from the group consisting of a full-wave rectification block and a half-wave rectification block.
26. The method of claim 23, comprising arranging five or more stacked piezoelectric elements.
27. The method of claim 23, further comprising providing a signal phase delay element between said one or more of said rectification blocks and said plurality of capacitors.
28. The method of claim 27, wherein said signal phase delay element comprises an inductor.
29. The method of claim 24, wherein said charge storage device comprises a battery.
30. The method of claim 24, wherein said charge storage device comprises a capacitor.

31. The method of claim 23, further comprising optimizing said charger for changes in ambient power from gravitational effects on a structure rotating at an angle to the surface of a significant gravity source.

32. The method of claim 31, wherein said structure is a wheel.

33. The method of claim 31, wherein said angle is approximately 90 degrees.

34. The method of claim 31, wherein said gravity source is the earth.

35. The method of claim 23, further comprising optimizing said charger for changes in ambient power from a heartbeat.

36. The method of claim 35, wherein said heartbeat is a human heartbeat.

37. The method of claim 23, further comprising optimizing said charger for changes in ambient power available from local electrical fields.

38. The method of claim 37, wherein said electric field comprises a field in the approximate range of 50 to 60 Hz.

39. The method of claim 23, further comprising optimizing said charger for changes in ambient power available from low power sound energy.

40. The method of claim 23, further comprising optimizing said charger for changes in ambient power available from ultrasound energy.

41. The method of claim 23, further comprising incorporating circuit board technology in said charger.

42. The method of claim 41, wherein said capacitors are not discrete elements.

43. The method of claim 23, further comprising optimizing said charger for changes in ambient power available from RF spectrum energy fields.

44. The method of claim 23, further comprising optimizing said charger for changes in magnetic fields.

* * * * *

UNITED STATES PATENT AND TRADEMARK OFFICE
CERTIFICATE OF CORRECTION

| | | |
|---|---|---|
| PATENT NO. | : 7,183,693 B2 | Page 1 of 1 |
| APPLICATION NO. | : 11/393326 | |
| DATED | : February 27, 2007 | |
| INVENTOR(S) | : Paul Brantner et al. | |

It is certified that error appears in the above-identified patent and that said Letters Patent is hereby corrected as shown below:

Title Page, Related U.S. Application Data should read:

--(63) Continuation of application No. 10/611,431, filed Jul. 2, 2003, now Pat. No. 7,088,031.

(60) Provisional application No. 60/464,357, filed on Apr. 22, 2003.--

In the claims:

Claim 6, column 8, line 1, "claim 1" should read --claim 5--.

Signed and Sealed this

Twenty-seventh Day of November, 2007

JON W. DUDAS
*Director of the United States Patent and Trademark Office*